(12) United States Patent
Tokuyama et al.

(10) Patent No.: US 6,256,501 B1
(45) Date of Patent: Jul. 3, 2001

(54) CELLULAR MOBILE TELECOMMUNICATIONS SYSTEM FOR CONTROLLING A HAND-OFF BY A MOBILE STATION

(75) Inventors: Katsumi Tokuyama; Katsutoshi Itoh, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/107,124

(22) Filed: Jun. 30, 1998

(30) Foreign Application Priority Data

Jul. 3, 1997 (JP) .................................................. 9-178117

(51) Int. Cl.⁷ ..................................................... H04B 1/00
(52) U.S. Cl. ........................................... 455/442; 455/437
(58) Field of Search ..................................... 455/436–477

(56) References Cited

U.S. PATENT DOCUMENTS 5,150,362 * 9/1992 Akerberg ............................ 370/95.1
5,267,261 * 11/1993 Blakeney, II et al. .................... 375/1
5,544,223 * 8/1996 Robbins et al. ......................... 379/58
5,956,641 * 9/1999 Bruckert et al. ....................... 455/422

* cited by examiner

Primary Examiner—Vivian Chang
Assistant Examiner—Makoto Aoki
(74) Attorney, Agent, or Firm—Rabin & Champagne, P.C.

(57) ABSTRACT

In a cellular mobile telecommunications system, upon a hand-off request signal generated by a mobile station, the base station control office transfers traffic data to both the base station to which the mobile station is presently connected and another base station to which the present base station is adjacent. A hand-off order message is transferred from the present base station toward the mobile station. The control office is adapted to control the adjacent base station to transmit the hand-off order message if it fails to receive a hand-off confirmation from the mobile station.

6 Claims, 5 Drawing Sheets

CELLULAR MOBILE TELECOMMUNICATIONS SYSTEM FOR CONTROLLING A HAND-OFF BY A MOBILE STATION

BACKGROUND OF THE INVENTION

1. Field of the Invention

The present invention relates to a cellular mobile telecommunications system, more particularly to a call hand-off system for a cellular mobile telecommunications system.

2. Description of the Background Art

As is well known in the art, a cellular mobile telecommunications system includes base stations, each of which covers a zone consisting of a plurality of cells. Mobile stations can be connected to one of the base stations via radio link. A call which is connected between a base station and a mobile station moving toward another base station adjacent to the earlier-mentioned base station must be handed over to the other base station, toward which the mobile station is moving. The call hand-off is dealt with call hand-off sequences between the two base stations under the control of a base station control office. The call hand-off is one of the characteristic features of the cellular mobile telecommunications system, regardless of the radio link scheme, such as analog or digital transmission system, or FDMA (frequency-division multiple access), TDMA (time-division multiple access) or CDMA (code-division multiple access) system.

With the CDMA cellular telecommunications system standardized by the U.S. regulation, TIA/EIA/IS-95, for example, the off-sets of the pilot PN (pseudo-noise) sequence are different from each other to efficiently or commonly use the radio frequency channels. In correspondence therewith, each mobile station includes a plurality of code demodulators common to a single radio receiver system so as to establish a seamless diversity receiving.

The CDMA cellular telecommunications system confronts the difficulty in call hand-off. Specifically, by the common hand-off sequence, a mobile station connected to a base station will be handed off to another base station when the mobile station has completed the hand-off sequence. This means that the common hand-off sequence is defined under the requirement that the hand-off control must be completed between a mobile station and a base station which has been connected to the mobile station until then.

More specifically, a mobile station send a hand-off request to a base station to which it is connected is receiving radio waves transmitted from the base station until it receives a hand-off command in response from the base station. If the mobile station moves, for example, and receives stronger radio waves emitted from another base station than the radio waves transmitted from the former base station, then there is interference, in the signals transmitted form the former base station to the mobile station caused by the stronger radio waves. Due to the interference of the signals, the mobile station is unable to decode signals from the former base station. With such a common hand-off control sequence as mentioned above, the call connection of the mobile station may be released from the former base station before completing the hand-off sequence. That phenomenon may take place more significantly in the band of 1.9 gigahertz (GHz) than 800 megahertz (MHz) because the diffraction loss in the band of 1.9 GHz is larger than in 800 MHz. The more sectors of a base station, the narrower the directivity of the antenna thereof, and thus the more significantly the aforementioned phenomenon may occur.

SUMMARY OF THE INVENTION

It is therefore an object of the present invention to provide a hand-off control sequence for use in a cellular mobile telecommunications system capable of establishing a more reliable hand-off.

In accordance with the present invention, a method of handing off a call connected to a mobile station by a first base station from the first base station to a second base station that base station is adjacent in a cellular mobile telecommunications system, comprises the steps of: receiving a first signal representing a hand-off request from the mobile station by a base station control office included in the cellular mobile telecommunications system; and forwarding a second signal representing a hand-off order directed to the mobile station by the base station control office to both the first base station and the second base station.

In a cellular mobile telecommunications system in accordance with invention, upon a hand-off request signal generated by a mobile station, the base station control office transfers traffic data to both the first base station and the second base station. A hand-off order message is transferred from the first base station toward the mobile station. The control office control the first base station to transmit the hand-off order message if it fails to receive a hand-off confirmation from the mobile station. This will enable a reliable, soft hand-off procedure of calls to be established from one base station to another.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
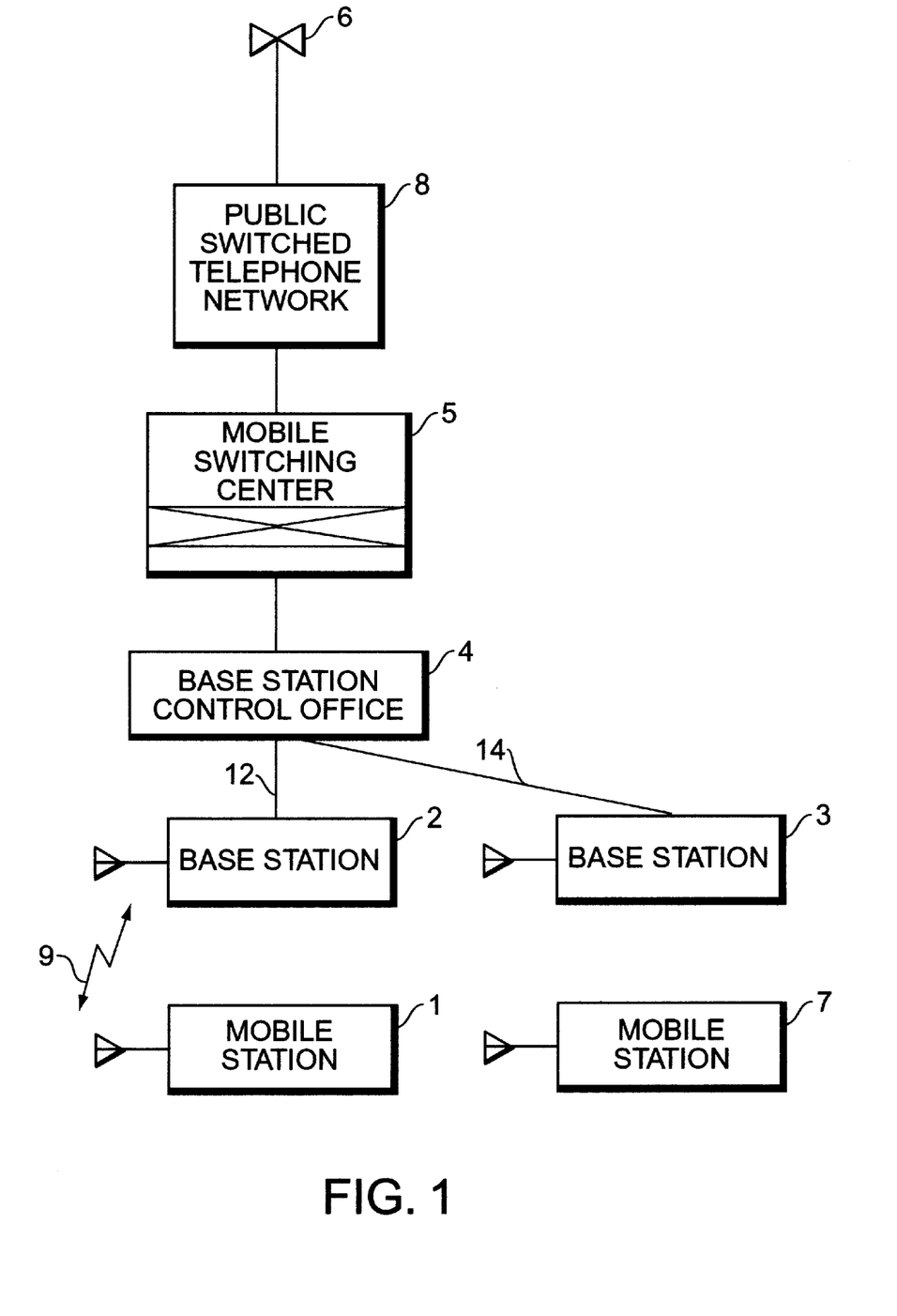
FIG. 1 schematically shows an embodiment of the present invention applied to a cellular mobile telecommunications system.

Referring to FIG. 1, a cellular mobile telecommunications system in accordance with a preferred embodiment of the invention generally includes a plurality of mobile stations, such as mobile telephone terminal sets, two of which are represented with reference numerals 1 and 7. For the purpose of description only, the cellular telecommunications system includes two base stations 2 and 3, which are adapted to be connectable to any of the mobile stations 1 and 7 by radio link, represented by a symbol 9. The base stations 2 and 3 are interconnected to a base station control office 4 by respective connections 12 and 14, which may be wired or wireless. In the embodiment, base stations 2 and 3 are geographically adjacent to each other and establish respective radio zones, such as cells or sectors, not shown, which are adjacent to and partially overlapped with each other. When the mobile stations 2 and 3 are covered by either of the cells of the base stations 2 and 3, they may be serviced with mobile telelcommunications mainly by either of the base stations 2 and 3.

The base station control office 4 controls to the base stations 2 and 3 to establish call connections between the mobile stations 2 and 3 and a mobile switching center 5 connected thereto. The mobile switching center 5 is adapted to switch calls between the mobile stations 1 and 7 and a public switched telephone network 8, which services a plurality of subscriber sets, such as telephone terminals, represented by a reference numeral 6. A communication path may be set up between the mobile station 1 and the subscriber set 6, for example, through the public switched telephone network 8 under the control of the base station control office 4.

Figure 2:
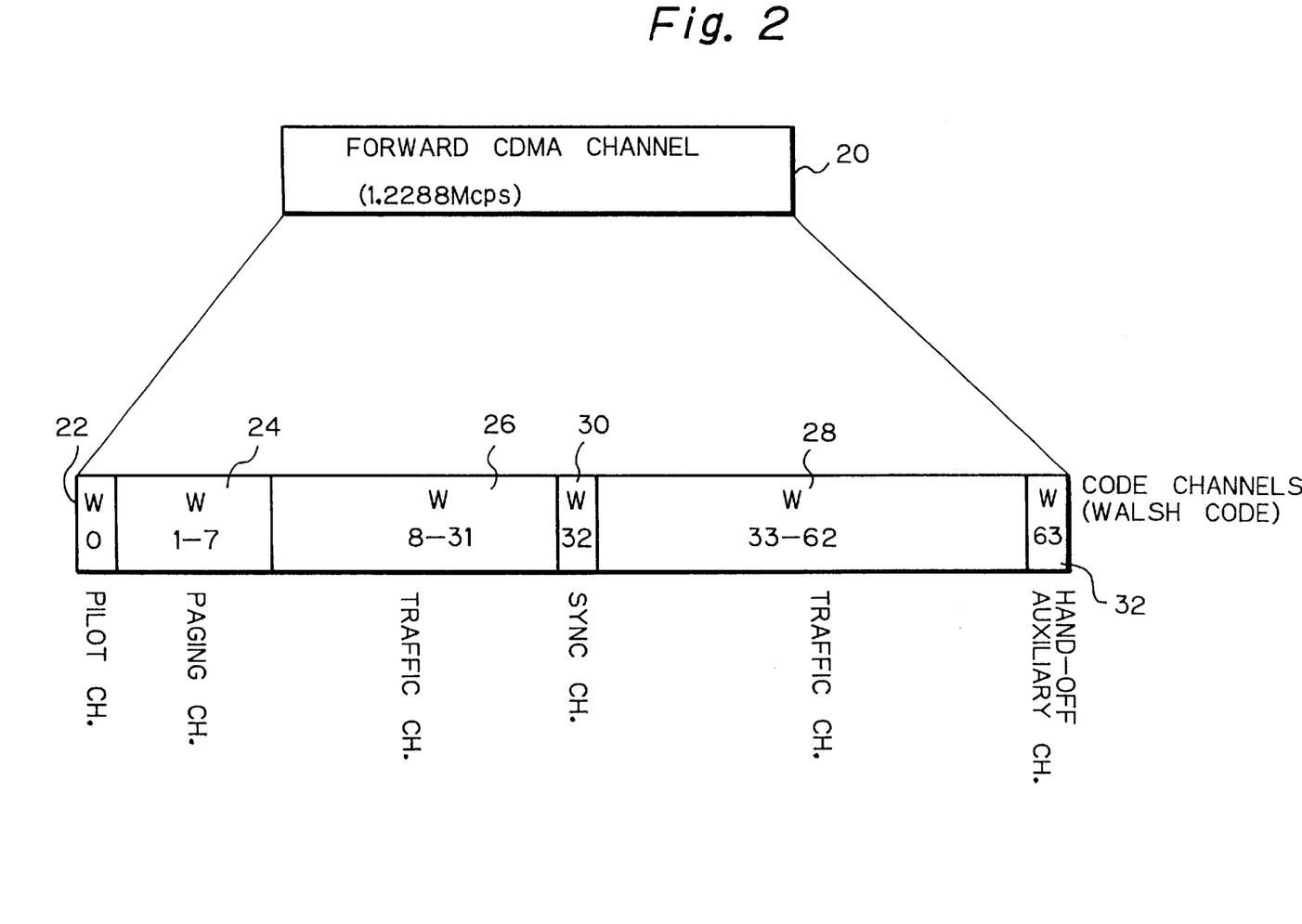
FIG. 2 shows an exemplified channel format used in the mobile telecommunications system shown in FIG. 1.

The illustrative embodiment is applicable to the CDMA cellular telecommunications system standardized by the U.S. regulation, TIA/EIA/IS-95. The mobile stations 1 and 7 are of the same structure, allotted to respective identifications, such as serial numbers. As described later, the mobile stations 1 and 7 typically include three rake receiver circuits, not shown, specifically adapted for receiving a forward CDMA channel 20, FIG. 2, transmitted from the base stations 2 and 3, in the illustrative embodiment. From the base stations 2 and 3, control data and commands or orders as well as user's information or traffice data, including speech and/or application signals are transmitted to the mobile stations 1 and 7 in the form of the forward CDMA channel 20 of 1.2288 megachips per second (Mcps), as shown in FIG. 2. As shown, the forward CDMA channel 20 includes a pilot channel 22 (W0), paging channels 24 (W1–W7), traffic channels 26 and 28 (W8–W31 and W33–W62), a sync channel 30 (W32) and a hand-off auxiliary or supplementary channel 32 (W63). The hand-off auxiliary channel 32 may be set in another code channel than W63. The present invention is also advantageously applicable to any types of cellular mobile telecommunications system, such as CODIT, other than the CDMA cellular telecommunications system of TIA/EIA/IS-95.

Figure 3:
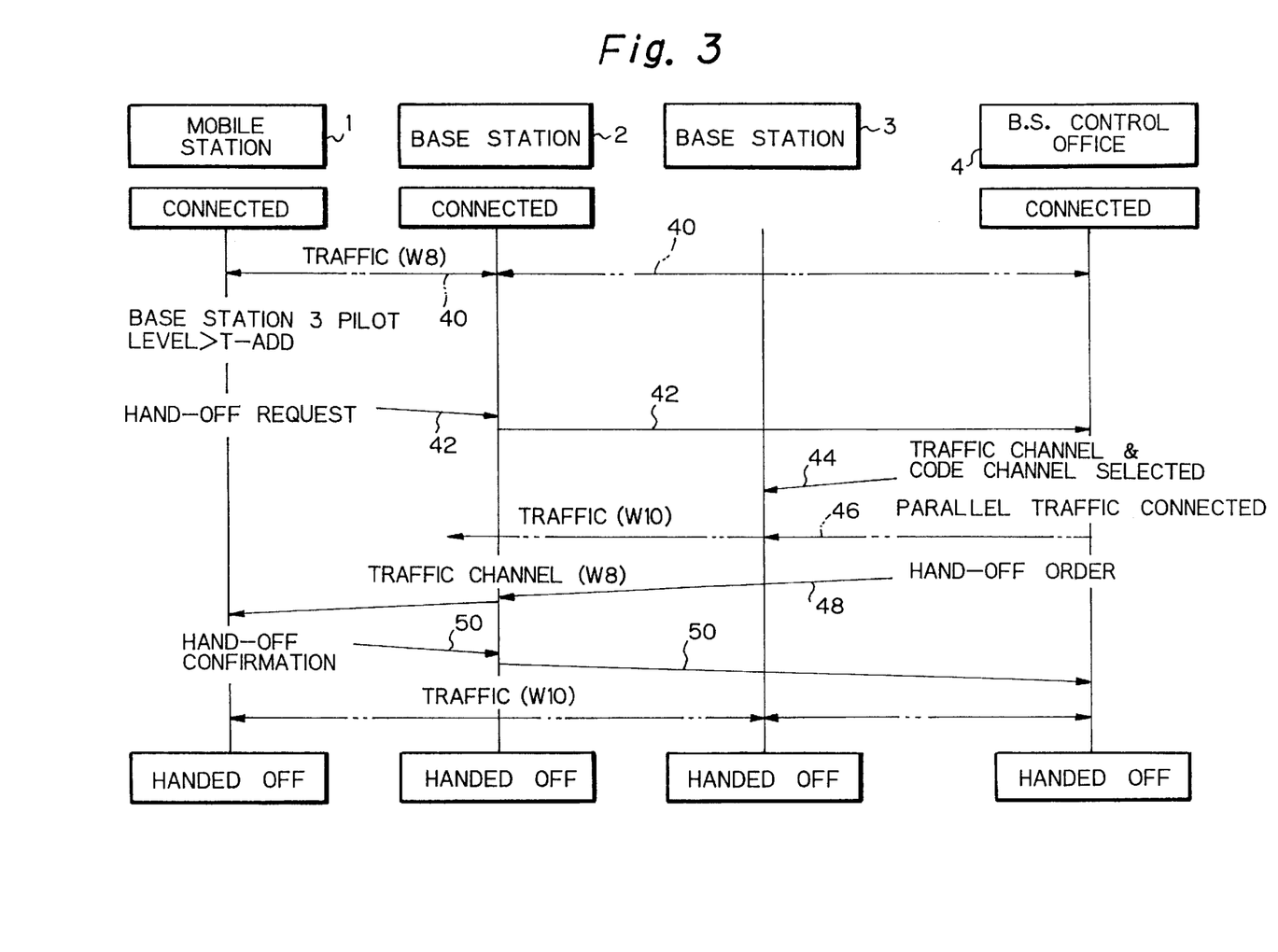
FIGS. 3 and 4 show examples of hand-off control sequence useful for understanding the hand-off operation in the illustrative embodiment shown in FIG. 1.

The base station control office 4 also controls a call hand-off control sequence between the two base stations 2 and 3, in the embodiment. In operation, a call connection is established between the mobile station 1 and the subscriber set 8, for example, through the base station 2, in the manner as is known in the art. This means that the mobile station 1 is now in the sector or cell formed by the base station 2. User's information, or speech data, is transmitted on the traffic channel W8, for example, as shown in FIG. 3 with a reference numeral 40. The mobile station 1 is constantly monitoring the magnitude, or power level, of the signals of the pilot channel 22 of the forward CDMA channel 20 transmitted from not only the base station 2 but also the adjacent base station 3.

While the mobile station 1 is moving apart from the base station 2 toward the other base station 3, the mobile station 1 determines when the thus monitored magnitude of the signals of the pilot channel 22 transmitted from the adjacent base station 3 exceeds a predetermined level, T-ADD, which is a threshold for starting a call hand-off. When the mobile station 1 detects the monitored magnitude exceeding the threshold, the mobile station 1 transmits a hand-off request signal 42, FIG. 3, to the base station 2. The hand-off request signal 42 is, when received by the base station 2, transferred to the base station control office 4, which in turn forwards a hand-off command or order toward the mobile station 1, as will be described later. The mobile station 1 notes the time when it receives the hand-off order for a predetermined period of time, 400 milliseconds (ms), in the embodiment. The mobile station 1 re-transmits a hand-off request signal a predetermined number of times until it receives a hand-off order from the base station control office 4.

The mobile station 1 constantly monitors signals transmitted from the base station 2 to determine how well it has received the signals. With the illustrative embodiment, the mobile station 1 measures the magnitude of the signals of the pilot channel 22 of the forward CDMA channel 20 transmitted from the base station 2, to which the mobile station 1 is presently connected. More specifically, the mobile station 1 calculates a correlated value between a PN sequence which the mobile station 1 possesses and one received from the base station 2. The mobile station 1 detects when a resultant, correlated value becomes less than a predetermined threshold to determine that the mobile station 1 is failing to appropriately receive signals from the base station 2.

Alternatively, the mobile station 1 may utilize an error detection code included in the frame data to determine how correctly the mobile station 1 receives data transmitted from the base station 2. More specifically, the mobile station 1 may use the error detection code to determine how many successively received frames include error data. If the number of erroneous, successive frames reaches a predetermined value, Nbad, then the mobile station 1 determines that it is failing to appropriately receive signals from the base station 2, where Nbad is a predetermined natural number.

When the mobile station 1 determines, in either of the ways described above, that it fails to appropriately receive signals from the base station 2, the mobile station 1 proceeds to the following procedures. The mobile station 1, which typically includes three rake receiver circuits, not shown, sets up some of, preferably one of, the rake receiver circuits to the pilot PN sequence offset and the hand-off auxiliary channel 32 which are directed to the base station 3 adjacent to the base station 2, to which the mobile station 1 is presently connected. The mobile station 1 is now ready to receive hand-off messages which may be transmitted even from both of the base stations 2 and 3. In the illustrative embodiment, the mobile stations 1 and 7 are adapted to determine, after having forwarded a hand-off request signal 42, whether or not it requires information on the hand-off auxiliary channel W63 transferred from the base station control office 4, dependent upon how correctly it receives the signals from the base station 2.

Returning to FIG. 3, the hand-off request signal 42 which the mobile station 1 transmitted to the base station 2, is in turn transferred from the base station 2 to the base station control office 4. The base station control office 4 scans the traffic channels 26 and 28 of the adjacent base station 3 to determine which of them are idle. When the control office 4 finds any idle traffic channel directed to the adjacent base station 3, the office 4 selects a code channel to be used for that idle traffic channel. Then the control office 4 forwards a transmission preparation command or order 44 to the base station 3. Successively, the control office 4 notifies the base station 3 of the serial number of the mobile station 1, which is now ready for a hand-off sequence. Simultaneously, while the control office 4 is transmitting user's data, e.g. speech and/or application signals, received from the subscriber set 6, to the base station 2, and transmitted therefrom on the traffic channel W8, for example, toward the mobile station 1, the control office 4 starts to forward in parallel the data to the base station 3 also, which will be transmitted on the traffic channel W10, for example. The traffic data transfer is indicated in FIG. 3 with a reference numeral 46.

More specifically, in response, the base station 3, which has received the transmission preparation signal 44, starts to modulate the speech signals thus transferred from the control office 4 with a long code of 42 bits, for example. The long code is dependent upon the code channel selected for, and the serial number of, the mobile station 1 which have been received from the control office 4. The speech or application signals thus modulated will in turn be transmitted on the radio waves from the base station 3 toward the mobile station 1 on the traffic channel Wl0, in this example.

The base station control office 4 then prepares a hand-off command or order and sends it out toward the mobile station 1 to the base station 2 in the form of a hand-off order message 48, which will be transmitted on the traffic channel W8, for example. The hand-off order message 48 includes the pilot PN sequence offset index and the code channel for both of the base stations 2 and 3.

If the base station 1 successfully receives the hand-off order message 48, then the station 1 sends out a hand-off confirmation signal 50 to the base station 2. If the hand-off confirmation signal 50 is successfully received by the base station 2, then it is in turn transferred from the base station 2 to the base station control office 4. The control office 4 receives the confirmation signal 50 and transfers control to the conventional part of the hand-off control sequence.

Figure 4:
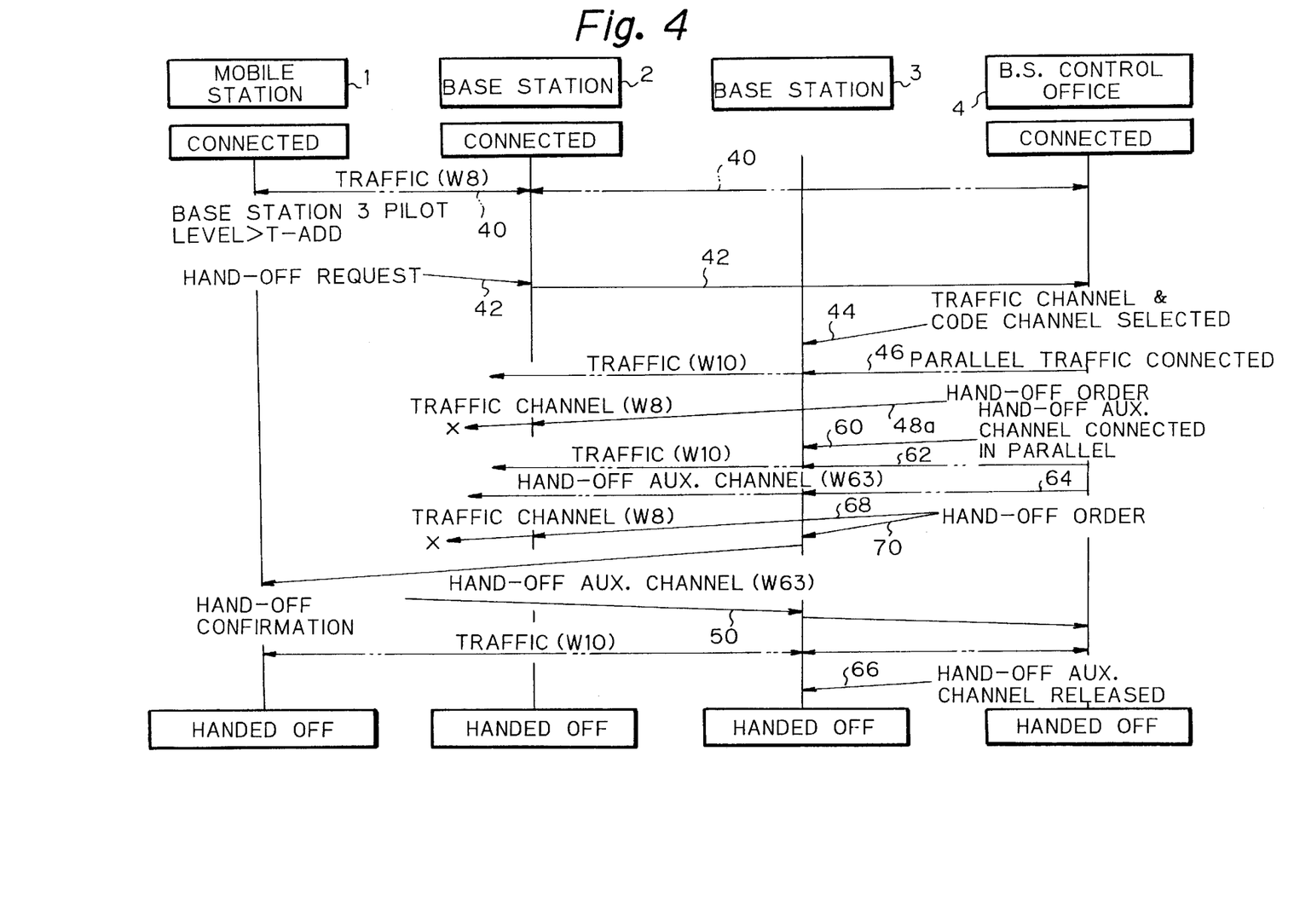

As shown with line 48a in FIG. 4, if the hand-off order message does not reach the intended mobile station 1, then the base station control office 4 fails to receive a hand-off confirmation signal 50 from the mobile station 1 in a predetermined period of time, e.g. 400 ms, since the control office 4 sent out the hand-off order message 48a. Then, the control office 4 instructs the adjacent base station 3 to set up the long code for the mobile station 1 in the hand-off auxiliary or supplementary channel W63. That notification is illustrated in FIG. 4 with an arrow 60. Then, in connection with the hand-off auxiliary channel W63, the control office 4 also transfers to the base station 3 the forward traffic data 62, which are the same as the data to be directed to the base station 2. The traffic data will then be transmitted on the traffic channel W10, for example.

By the illustrative embodiment, the hand-off order message 64 is transferred from the control office 4 to the base station 3 toward the mobile station 1. The control office 4 may repetitively transmit hand-off re-transmission orders 68 and 70, FIG. 4, to the base stations 2 and 3, respectively, to cause the latter to repeat the transmission of the hand-off order message either until the control office 4 receives a hand-off confirmation signal 50 from the mobile station 1 or until a predetermined period of time since it transmitted the hand-off message 64 elapses. The hand-off order message is thus transmitted toward the mobile station 1 via both of the base stations 2 and 3.

If the mobile station 1 is successful in receiving the hand-off order message 48a, then the mobile station 1 sends out a hand-off confirmation signal 50 to the base station 3 toward the base station control office 4, sets up the code channel designated by the hand-off order message 48a thus received, and then releases the hand-off auxiliary channel W63.

When the base station control office 4 receives the hand-off confirmation signal 50, the control office 4 in turn instructs the base station 3 to cease the hand-off auxiliary channel W63, as depicted with an arrow 66 in FIG. 4. The forward traffic data which has been connected to the hand-off auxiliary channel W63 is released therefrom. This means a completing of the hand-off procedure so that a radio link is established between the mobile station 1 and the new base station 3. The hand-off auxiliary channel W63 thus released may be used for or assigned to a usual traffic channel after the hand-off sequence has been completed.

In almost all cases, when a radio link is set up between the mobile station 1 and the new base station 3, the mobile station 1 may receive from the old base station 2 the radio waves of the pilot signal in a magnitude less than a predetermined power level at which a call is to be handed over or disconnected from the old base station 1. Part of the hand-off control sequence will be commenced by which the old base station 1 is handed off. For the purpose of handing off or releasing the base station 1, the hand-off auxiliary channel W63 is not used in the embodiment. The hand-off auxiliary channel W63 is used in the embodiment for additionally connecting the new base station 3 to the old base station 2 to which the mobile station 1 has been connected.

If two or more mobile stations 1 and 7, FIG. 1, send out a hand-off request almost simultaneously, then the base station control office 4 will handle one, e.g. 1, of the mobile stations 1 and 7 from which the hand-off request is registered earlier than the remaining one or ones, e.g. 7. The mobile station 7 will then be treated later on, that is, after the hand-off procedure of the mobile station 1 has been completed. The mobile station 7 also monitors the hand-off auxiliary channel W63, which contains a long code including the serial number of the mobile station 1, which is of course different from that the mobile station 7. When the mobile station 7 receives the hand-off auxiliary channel W63 and de-spreads the data of the auxiliary channel W63, it fails to establish a correlation between them so as not to obtain any data of the channel directed to the mobile station 1. Any crosstalk will therefore be avoided.

In order to avoid unnecessary transmission of radio waves and minimize the channels required for the base stations, it is advantageous to efficiently utilize the system resources to design the system adapted to transmit the hand-off auxiliary channel as late as possible to reduce the possibility in busy conditions of the hand-off auxiliary channel.

A plurality of hand-off auxiliary channels may be included in the forward CDMA traffic channel 20. In such an application, it is advantegeous that the plurality of hand-off auxiliary channels may selectively be designated by the least significant digit or bits of the identification code of the mobile stations 1 and 7. This causes the hand-off control sequence to simultaneously be performed with respect to two or more mobile stations 1 and 7.

The number of the traffic channels W8–W31 and W33–W62 is designed depending upon the number of mobile stations that is allowed be connected simultaneously. Under the heavy traffic conditions, in which a single traffic channel remains idle, for example, the base station 3 cannot assign the remaining traffic channel to a mobile station having requested a call hand-off for both a traffic channel together and a hand-off auxiliary channel. Under such a circumstance, the base station 3 may assign first the hand-off auxiliary channel to the single remaining channel, and will, after the base station 3 receives a hand-off confirmation signal 50 from the mobile station 1, set up the hand-off auxiliary channel to the designated traffic channel code. This may cause an instantaneous interruption of transmitted signals, but maintains the continuity of the call connection.

With the CDMA cellular mobile telecommunications system defined by the TIA/EIA/IS-95, the allowable number of simultaneous call connections depends upon the channel conditions of the reverse traffic due to errors or the like in the closed-loop power control system. In the state of art, twenty-one subscribers may be connected simultaneously with the frame error ratio of 1% satisfied. The illustrative embodiment is provided with the hand-off auxiliary channel W63 included in the forward traffic channel 20, without decreasing the traffic capacity of the system.

In the operation of the instant embodiment described above, the hand-off request signal 42 generated by the mobile station 1 is received by the base station 2 and is in turn transferred to the base station control office 4. With a much lower possibility, the mobile station 1 may leave abruptly the cell of the base station 2 so that the base station 2 does not receive the hand-off request signal 42 sent from the mobile station 1. Under the circumstances, the base station control office 4 has not received any hand-off request from the mobile station 1, thus designating no hand-off auxiliary channel for the mobile station 1, of course. If that situation continues for a predetermined period of time, e.g. five seconds, then the call be released.

In order to avoid a call release due to failure of the base station control office 4 in receiving the hand-off request generated from the mobile station 1, the mobile station 1 is advantageously designed to measure the magnitude or power level of the radio waves forming the pilot signal transmitted from the base station 2 when transmitting a hand-off request signal 42 toward the base station 2. If the measured magnitude of the pilot signal radio wave is less than a predetermined threshold, then the mobile station 1 can expect that the call will be disconnected shortly, and may shift the control to the specific operational mode, described below, in order to avoid a call release. Alternatively, if the mobile station 1 fails to receive a hand-off order message 48a from the base station 2 in a predetermined period of time, e.g. 4.4 seconds, which is shorter than the predetermined period of time, 5 seconds, mentioned in the preceding paragraph, then the mobile station 1 will shift the control to the specific operational mode, which will be described below.

More specifically, the mobile station 1 may re-transmit a hand-off request signal 42 until either it receives a hand-off order message 48a or until the predetermined period of time, 4.4 seconds. When the predetermined period of time expires, the mobile station 1 transmits a hand-off request signal together with the identification number of the mobile station 1 over the access channel. If the mobile station 1 is in the cell of the base station 3 adjacent to the base station 2 although it is outside the cell of the latter base station, then the base station 3 can be responsive to receiving the hand-off request signal on the access channel including the identification number of the mobile station 1. The base station 3 will in turn notify the base station control office 4 of the reception of the hand-off request generated by the mobile station 1. The control office 4 will then treat the hand-off request pursuant to the procedure similar to that for newly establishing a call connection between the base station 3 and the mobile station 1 on the access channel. This causes the call to be continued on the mobile station 1 not via the base station 2 but the base station 3.

As can be understood from the above description, the illustrative embodiment introduces the hand-off auxiliary channel for handing off a call from one base station to another, thus reducing the load on the base stations imposed for handling a hand-off control sequence. This decreases the possibility of calls being disconnected unexpectedly while being handed over.

Figure 5:
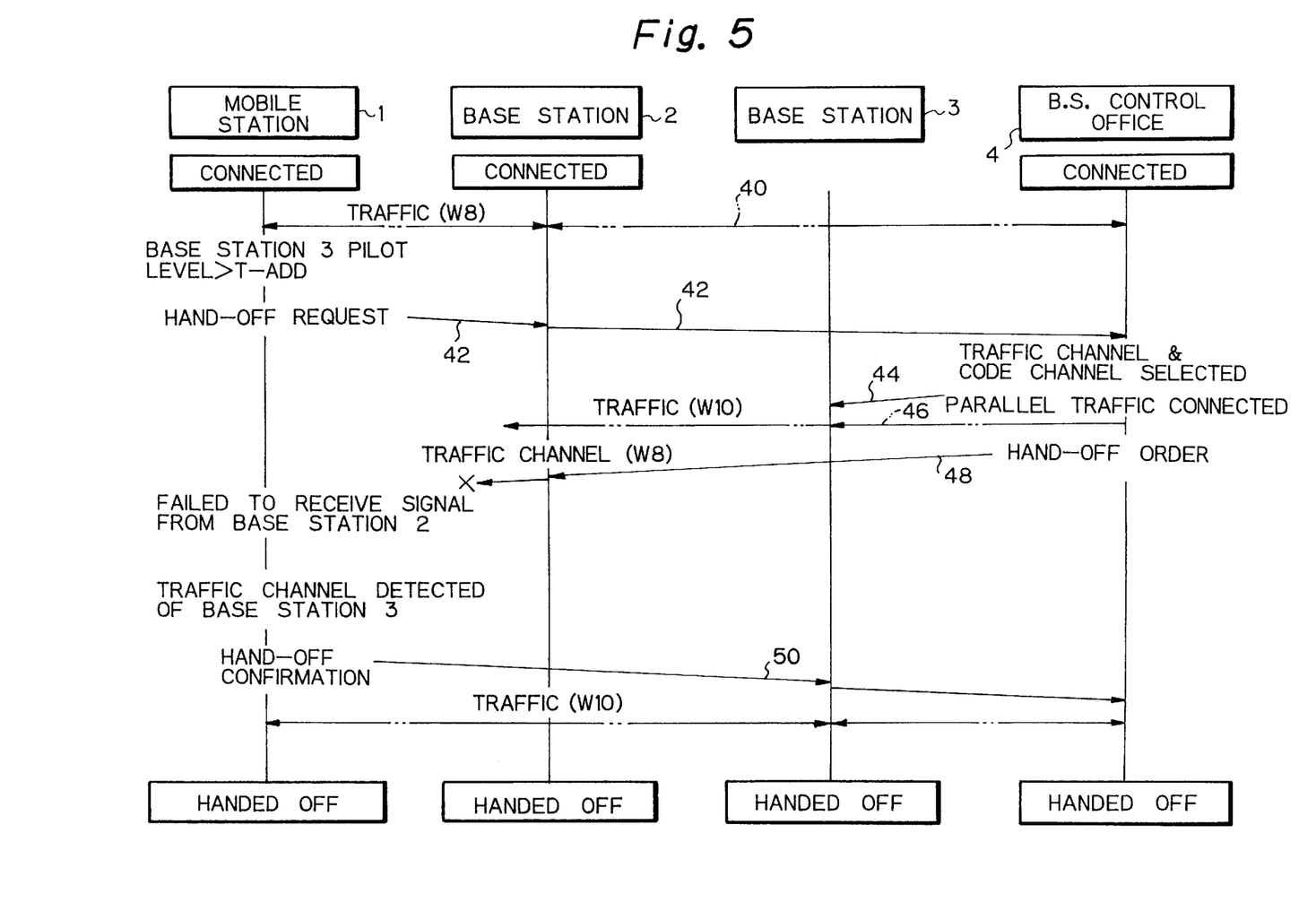
FIG. 5 shows, similarly to FIG. 4, another example of hand-off control sequence in the illustrative embodiment shown in FIG. 1.

With reference to FIG. 5, an alternative embodiment of the hand-off control sequence will be described in which a hand-off auxiliary channel is not involved for accomplishing a hand-off procedure. In the figure, the like elements are designated with the same reference numerals as FIGS. 1–4, and a redundant description will be avoided. The call hand-off control sequence shown in FIG. 5 is the same as what is shown in and described with reference FIGS. 3 and 4 except that, instead of a hand-off auxiliary channel, one of the code channels which is to be used for a traffic channel for a new base station, to which a mobile station that has requested a call hand-off is to be handed over, is set up for transmitting a -hand-off command or order message from the base station control office 4 toward the mobile station.

When the base station control office 4 receives the hand-off request signal 42 which the mobile station 1 sent out, the control office 4 selects one of the code channels and notifies the base station 3 of the one code channel thus selected, as shown with the arrow 46 in FIG. 5, as described with reference to FIG. 3 or 4. The selected code channel will be transmitted from the base station 3 on the traffic channel W10, for example, directed to the mobile station 1. The hand-off message 48 is transferred from the control office 4 to the base station 2, being directed to the mobile station 1, as depicted by the arrow 48.

In the meantime, if the mobile station 1 determines from the monitored maginitude of the radio waves emitted from the base station 2 that it fails to correctly receive signals from the base station 2, then the mobile station 1 proceeds to the following procedures in the alternative embodiment. The mobile station 1 sets up some of, preferably one of, its three rake receiver circuits, not shown, to the pilot PN sequence offset and one of the code channels available to the traffic channel for the base station 3 which is adjacent to the base station 2, to which the mobile station 1 is presently connected.

The mobile station 1 is operative to receiving the signals transmitted from the base station 3 by the one rake receiver circuit set up to the code channel selected. The mobile station 1 extracts the error detection code included in the received data on the traffic channel for the base station 3, and determines how correctly the mobile station 1 receives the data transmitted from the base station 3. More specifically, the mobile station 1 examines the error detection code to determine how many successively received frames include error data. If the number of erroneous, successive frames reaches a predetermined value, Nerror, then the mobile station 1 sets the rake receiver circuit to another code channel available to the traffic channel of the base station 3, where Nerror is a natural number. By contrast, if the mobile station 1 is successful in receiving a predetermined number, Ngood, of the continuous frames of correct data from the base station 3, then the station 1 determines that the traffic channel is established on which the base station 3 will transmit data to the mobile station 1, where Ngood is also a positive integer. The mobile station 1 will then transmit a hand-off confirmation signal 50 to the base station 3.

With the alternative embodiment as described above, the mobile station 1 can set up the hand-off control sequence to the new base station 3 without receiving any hand-off order message from the old base station 2. If the mobile station 1 cannot receive any correct data on its code channels available to its traffic channel, then it will disconnect the outstanding call connection.

With the alternative embodiment, in order to determine a code channel available to the transmission from the base station 3 to the mobile station 1, a plurality of code channels are tested to be set up. Until the mobile station 1 can receive correct data, the station 1 scans its available code channels in sequence to be examined. In an application in which 61 traffic code channels are available, a call connection may be interrupted during the period of frames, the number of which is equal to (Nerror*60+Ngood). In order to reduce the interruption period of time, the system may be designed such that the base station 2 notifies in advance the mobile station 1 of a reduced number of code channels that are available to the base stations adjacent to the base station 2 upon a hand-off request. In an exemplified application, the mobile station 1 may be notified that only the odd-numbered channels, for example, are available to the traffic channel for a base station to which the call is handed over from the mobile station 1, the interruption period of time thus being reduced by half at the most.

The base stations 2 and 3 may advantageously include data representative of code channels available to the traffic channels for handing off a call to a base station or stations, to which the base stations 2 and 3 are adjacent. The data representative of such code channels may be stored in a storage device, not shown, of the base stations 2 and 3 in the form of a table listing hand-off code channels. The list may advantageously be updated periodically since the traffic conditions or loads on the traffic channels of every base station are always changeable from time to time.

With the alternative embodiment described above, the mobile station 1 is adapted to search for a code channel for a base station to which a call connected to the mobile station 1 is to be handed over. This structural feature makes it possible to enable a call of a mobile station to be handed off from one base station to another even when the mobile station fails to receive signals from the one base station to which it has connected ever, resulting in reduction of the possibility of unexpected releasing of calls.

The entire desclosure of Japanese patent application No. 178117/1997 filed on Jul. 3, 1997 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What we claim is:

1. A method of handing off a call connected to a mobile station from a first base station to a second base station that is adjacent thereto in a cellular mobile telecommunications system, wherein the cellular mobile telecommunications system is a code-division multiple access (CDMA) system in which a forward code channel is transmitted from each of the first and second base stations to the mobile station, and wherein the mobile station has an identification code assigned thereto, said method comprising the steps of:

receiving a first signal including a hand-off request from the mobile station at a base station control office included in the cellular mobile telecommunications systems;

forwarding a second signal including a hand-off order directed to the mobile station by the base station control office to both the first base station and the second base station;

allotting a hand-off auxiliary channel in the forward code channel to the mobile station by the second base station; and modulating a message including the hand-off order with a code according to the hand-off auxiliary channel and the identification code assigned to the mobile station to transmit the message to the mobile station.

2. The method in accordance with claim 1, further comprising the step of preparing at least one additional hand-off auxiliary channel in the forward code channel;

wherein said step of allotting comprises the substep of selectively allotting one of the hand-off auxiliary channel to the mobile station in accordance with the identification code assigned to the mobile station.

3. The method in accordance with claim 1, further comprising the steps of:

handing off the call to the second base station; and using a code channel used for the hand-off auxiliary channel for a traffic channel by the second base station.

4. The method in accordance with claim 1, further comprising the steps of:

determining, after the mobile station has sent the first signal, the strength of a data signal sent to the mobile station from the first base station; and determining whether or not the message is necessary in accordance with the result of the data signal strength determining step.

5. The method in accordance with claim 1, further comprising the step of sending out the message on a traffic channel of the forward code channel for the first base station.

6. A method of handing off a call connected to a mobile station from a first base station to a second base station that is adjacent thereto in a cellular mobile telecommunications system, said method comprising the steps of:

receiving a first signal including a hand-off request from the mobile station at a base station control office included in the cellular mobile telecommunications system;

forwarding a second signal including a hand-off order directed to the mobile station by the base station control office to both the first base station and the second base station;

transmitting a forward code channel from the first base station to the mobile station;

allotting a hand-off auxiliary channel to the forward code channel in the second base station, and transmitting the forward code channel to the mobile station from the second base station;

assigning an identification code to the mobile station; and modulating a message including the hand-off order with a code according to the hand-off auxiliary channel and the identification code assigned to the mobile station to transmit the message to the mobile station.

* * * * *